United States Patent Office 2,883,217
Patented Apr. 21, 1959

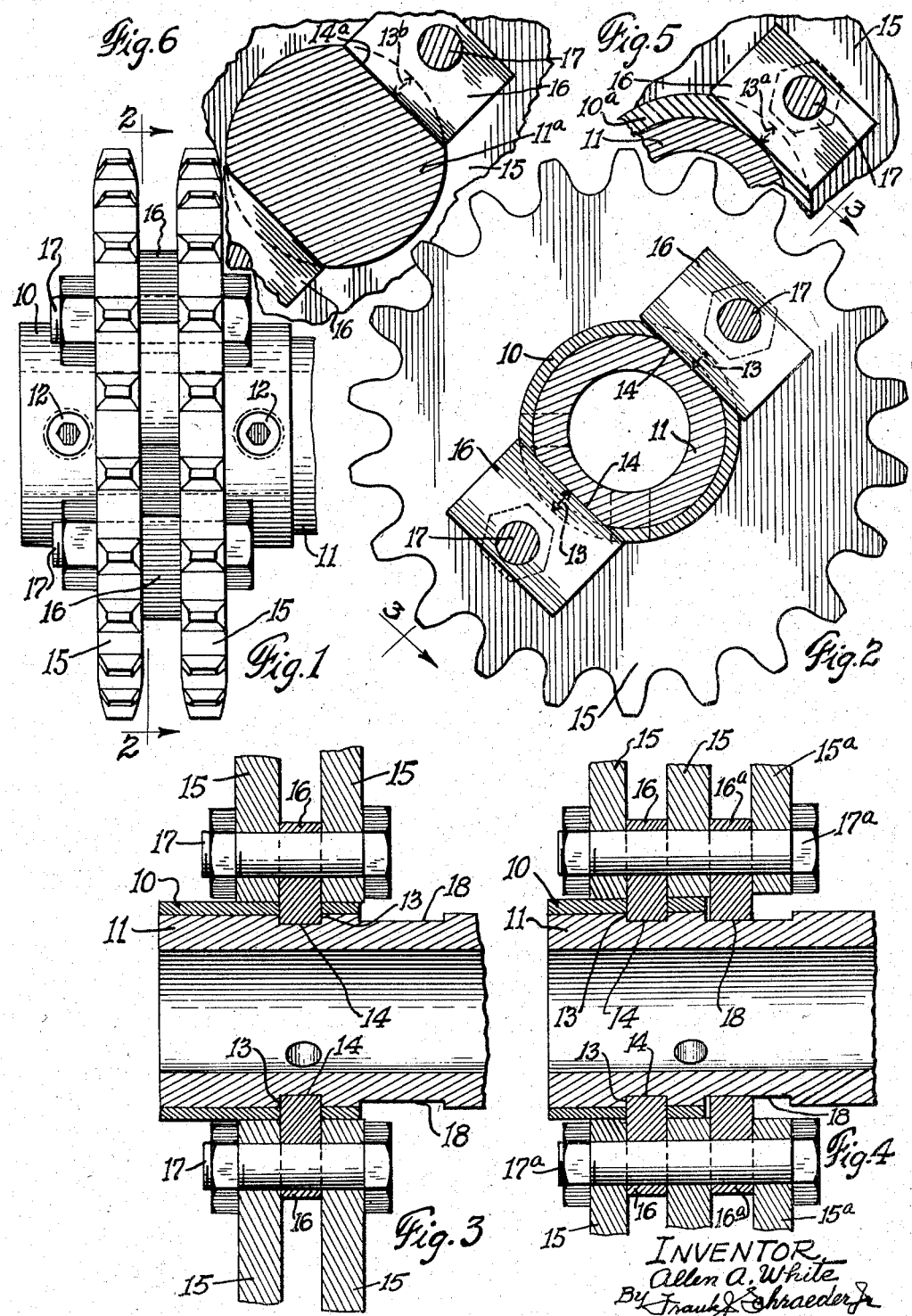

2,883,217

MEANS FOR MOUNTING ROTATABLE POWER-TRANSMITTING MEMBERS ON ROTATABLE AXIAL MEMBERS

Allen A. White, Peabody, Kans., assignor to Hesston Manufacturing Co., Inc., Hesston, Kans., a corporation of Kansas.

Application May 27, 1954, Serial No. 432,725

5 Claims. (Cl. 287—52)

The present invention relates to means for detachably mounting wheels, sprockets, gears, pulleys and the like power-transmitting devices on hubs, shafts, spindles, axles or other rotatable members and has among its objects to create a simple and efficient mounting that shall possess desirable characteristics not found in any prior mounting of which I am aware, and which can be manufactured more easily and cheaply than said prior mountings.

The basic feature of the invention is a simple means for creating a readily releasable interlocking wedging or binding action between the power transmitting and the axial members to cause them to rotate as a rigid whole in use. This is accomplished by means of detachable blocks supported on the rotatable power-transmitting members about diametrically opposed axes parallel to but radially spaced from the axis of the rotatable assembly, and having flat surfaces engaged with flat faces of peripheral slots that extend in the rotatable axial member transversely of its axis; the axis of the support for each block being preferably about midway between the ends of the same and the relatively wide range of large tolerances permissibly employed in machining devices of this character affording slight incipient rocking movements of the blocks when the members start to rotate, in either direction, under a load applied to one of them.

The blocks may be simple rectangular pieces, so that no special machining is required to produce the blocks or the rotary power-transmitting members and the rotary axial members other than the slots and the boring of bolt holes.

At least one of the peripheral slots on each rotary axial member is preferably a transverse groove, recess or slot into which the corresponding block may extend. This prevents displacement of the power-transmitting members axially of the rotatable axial member.

Bolts are employed for securing the blocks and the power-transmitting members together, only the same number of bolts being used in an assembly containing any desired number of power-transmitting members as are required when there is only a single power-transmitting member.

One need only to unscrew the nuts and remove the bolts to separate an assembly into its separate components.

The bolts serve not only to hold the parts together, but also function as a means imparting to the blocks desired frictional resistance to their incipient rocking movements and to improve their frictional interengagement with the rotatable power-transmitting members.

The various features of novelty whereby the present invention is characterized will hereinafter be pointed out with particularity in the claims; but, for a full understanding of the invention and of its objects and advantages, reference may be had to the following detailed description taken in connection with the accompanying drawing, wherein:

Figure 1 is a side view of an assembly that embodies the present invention applied to two rotatable power-transmitting sprockets;

Fig. 2 is a section on line 2—2 of Fig. 1;

Fig. 3 is a fragmentary axial section on line 3—3 of Fig. 2;

Fig. 4 is a view similar to Fig. 3 illustrating an assembly containing three power-transmitting members;

Fig. 5 is a fragmentary cross-section showing an interlock between a hub and a rotatable power-transmitting member; and Fig. 6 is a fragmentary cross-section showing an interlock between a solid shaft and a rotatable power-transmitting member.

Referring to Figs. 1 to 3 inclusive of the drawing, 10 represents a cylindrical member rotatable about an axis. In the arrangement shown, this member 10 is shown as a hub in the form of a sleeve. The hub is shown as surrounding a tubular shaft or spindle 11 and being held secured thereto as by set screws 12. As shown in Fig. 3 there are two diametrically opposed open-ended recesses or slots 13, 13 which due to the relatively thin hub wall extend inwardly partly into the periphery of the shaft; the bottoms 14, 14 of these slots being flat faces and the longitudinal centers of which are in a common plane at right angles to or transversely of the axis of the hub.

Surrounding the hub, on opposite sides of the slots, are two rotatable power-transmitting members illustrated as sprockets 15, 15 or other members that have central portions of uniform thickness, or the equivalent; these members preferably having a close sliding fit on the hub. Between the members 15, 15 are two blocks 16, 16 shown as and preferably being simple flat rectangular blocks set with one edge in loose contact with the bottoms of the two recesses or slots 13, 13. Two bolts 17, 17, each passing through the two sprockets 15, 15 and one of the blocks, clamp the members 15, 15 and the blocks 16, 16 together. Each bolt passes through the corresponding block about midway between the ends of the latter, radially outwardly from the hub, with its axis parallel to the axis of the hub.

The parts are preferably so proportioned that, although the blocks are mounted on the sprocket members 15 for rocking movements, such movements do not pass beyond the incipient stage for the reason that at least major portions of their inner or under edge faces constantly contact the flat bottom surfaces 14 of the slots 13. Consequently there can be no back lash upon turning the hub or spindle member in either direction, in a situation wherein hub or spindle drives the two sprocket members. For, assuming that the hub begins to turn in the clockwise direction, as viewed in Fig. 2, and the drag of the sprocket chains tends to turn them in the counter-clockwise direction: the engaged flat surfaces 14 of the blocks 16 and hub 10 and spindle 11 impart camming actions against the blocks 16 during slight incipient relative turning movement between the hub and the sprockets; the hub pushing outwardly on one end portion of each block and thus forcing that block into firmer engagement with the hub. Then if the movement of the hub be reversed, there is already intimate contact between the ends of the blocks which the hub tends to push outwardly. When the sprockets are driving the hub, the hub-engaged end portions of the slightly shifted blocks press inwardly on diametrically opposed sides of the hub against surfaces 14 disposed on relatively opposite sides of a plane intersecting the axes of the hub and bolts 17, forcing the opposite end portions outwardly. Consequently every turning movement begins and continues smoothly and without back lash.

The nuts on the bolts 17 may be only tight enough to prevent what would amount to free rocking of the blocks in the absence of the hub, or they may be tightened to provide any desired degree of frictional resistance between the blocks and the sprockets 15, 15.

The construction just described provides a balanced distribution of the stresses created in the assembly when the latter is in operation, just as though the several members were integral with each other.

It should be noted that while a pair of blocks are used, the number may be greater. On the other hand a single block may be satisfactory for some purposes where a relatively small amount of power is to be transmitted.

When only one sprocket or other power-transmitting member is required, the one at the left in Figs. 1 and 3, for example, is omitted, a second pair of blocks are set on parallel flat slots 18, 18 on the right hand portion of the spindle or shaft member; each of these slots 18, 18 being in the same plane as is one of slots 13 as shown in Figs. 3 and 4. The bolts then extend through the single power-transmitting member and through the two blocks on opposite sides thereof; thus providing a balanced construction and distribution of stresses during use as in the assembly shown in Figs. 1 and 3.

When more than two power-transmitting members are required, the axial member should be provided with additional slots 13, one for each additional block. In Fig. 4 the hub 10 carries three power-transmitting members. Two of the sprockets shown and one pair of blocks correspond to the sprockets and blocks shown in Figs. 1 and 3. There is, however, a second pair of blocks designated by numeral 16$^a$ to distinguish them from the first pair, resting on the flat slots 18 of the spindle member 11. The third sprocket 15$^a$ is disposed axially from and face-engaged with the second pair of blocks 16$^a$. Bolts 17$^a$, that extend through the three sprockets and the intervening blocks, differ from bolts 17 only in that they are longer than the latter.

Fig. 5 illustrates the adaptation of my invention to a spindle 11 and a hub 10$^a$ having a wall substantially thicker in section than that of the hub 10 shown in Figs. 1 to 4 inclusive, because of the increased thickness of the hub wall, the recesses or slots 13$^a$ extend only into such hub 10$^a$ and not partially into the wall of the spindle 11 as in the adaptations shown in Figs. 1 to 4 inclusive.

Obviously one or more power-transmitting members such as, for example, the sprockets 15, 15 may readily be detachably mounted on a solid rotatable shaft 11$^a$ in which event the recesses or slots 13$^b$ for the interlocking blocks 16 extend into opposite sides of the shaft 11$^a$ the desired distance to provide the necessary bearing surfaces 14$^a$ for the power to be transmitted by or to the one or more sprockets 15 through the blocks 16 and bolts 17. This adaptation of the invention to a solid rotatable shaft is illustrated in Fig. 6.

As apparent from the above description, my invention is adapted for transmitting rotary motion to the hub 10, 10$^a$, spindle 11 or shaft 11$^a$ when the sprocket 15 or its equivalent is power driven by any well known means and, reversedly, my invention is adapted for transmitting rotary motion to the sprocket 15 when the spindle 11 or shaft 11$^a$ is power driven or driven by wheel of a vehicle by traction and in either instances of its many uses, the one or more power-transmitting members such as wheels, sprockets, gears, pulleys or the like, are rendered quickly demountable and interchangeable by the use of novel and simple means for interlocking same with a cooperative hub, spindle or shaft.

In transmitting rotary motion to axial member 11 or 11$^a$ from the sprocket members 15, or vice versa, the blocks 16—16$^a$, due to frictional forces imposed between the blocks and the slots 13, slightly shift and tend to revolve about the axes of bolts 17 and thus cause a binding or wedging of the blocks in the slots 13 in addition to the frictional resistance created between the sides of the blocks and the adjacent sides of the sprockets 15 induced by bolts 17. This binding and wedging action is an important and practical feature of my invention which is afforded by the comparatively wide range of large tolerances permissibly employed in machining and assembling devices of the type and character herein contemplated; such tolerances permitting the blocks to shift or rock about the axes of their supporting bolts without loss of power transmission between the members of the assembly and this is possible during the incipient movements of the blocks for the reason that, during such incipient movements, the distances from the axial centers of the bolts to the inner edges of the blocks, on a line intersecting the axes of the axial member 11 or 11$^a$ and bolts 17, are progressively slightly increased thereby increasing the frictional resistances between the blocks and the inner axial member to provide the desired binding or wedging actions therebetween to rotatably frictionally interlock the outer members with the inner axial member.

While I have illustrated and described with particularity only preferred forms of my invention, I do not desire to be limited to the exact details thus illustrated and described; but intend to cover all forms and arrangements coming within the definitions of my invention constituting the appended claims.

I claim:

1. In a rotatable unit, an elongated, transversely circular shaft having a transverse groove and a longitudinal axis about which the same rotates, said shaft being provided with a pair of opposed, flat, parallel walls forming the sides of the groove, said side walls having arcuate outermost edges coincident with the periphery of the shaft; a power transmitting member having a circular bore surrounding the shaft adjacent the groove; a block extending into said groove and spanning the distance between said side walls thereof, said block being disposed in flat, overlapping engagement with one face of the member exteriorly of the groove; and an elongated pivot fastener for the block extending through the member and the block exteriorly of the groove in parallelism with said axis and clamping the block and member together, said block having an elongated, flat, innermost edge always flatly engaging the shaft in the bottom of the groove and disposed transversely of the shaft whereby the block holds the member against rotation relative to the shaft and against longitudinal reciprocation along the shaft, said block sliding along said bottom of the groove as it pivots about the fastener whereby the block serves as a wedge.

2. In a rotatable unit, an elongated, transversely circular shaft having a transverse groove and a longitudinal axis about which the same rotates, said shaft being provided with a flat, rectangular wall forming the bottom of said groove and a pair of opposed, flat, parallel walls forming the sides of the groove, said side walls having straight edges at the lines of merger thereof with said bottom wall and arcuate outermost edges coincident with the periphery of the shaft; a power transmitting member having a circular bore surrounding the shaft adjacent the groove; a block extending into said groove and spanning the distance between said side walls thereof, said block having a longitudinal edge always seated flatly against said bottom wall and being disposed in flat, overlapping engagement with one face of the member exteriorly of the groove; and an elongated pivot fastener for the block extending through the member and the block exteriorly of the groove in parallelism with said axis and clamping the block and member together whereby the block holds the member against rotation relative to the shaft and against longitudinal reciprocation along the shaft, said block sliding along said bottom wall as it pivots about the fastener whereby the block serves as a wedge.

3. In a rotatable unit, an elongated, transversely circular shaft having a transverse groove and a longitudinal axis about which the same rotates, said shaft being provided with a pair of opposed, flat, parallel walls forming the sides of the groove, said side walls having arcuate outermost edges coincident with the periphery of the shaft; a pair of spaced power transmitting members, each having a circular bore surrounding the shaft adjacent the groove; a block extending into said groove and spanning the distance between said side walls thereof, said block being disposed between the members in flat, overlapping engagement with proximal faces thereof exteriorly of the groove; and an elongated pivot fastener for the block extending through the members and the block exteriorly of the groove in parallelism with said axis and clamping the block and members together, said block having an elongated, flat, innermost edge always flatly engaging the shaft in the bottom of the groove and disposed transversely of the shaft whereby the block holds the members against rotation relative to the shaft and against longitudinal reciprocation along the shaft, said block sliding along said bottom of the groove as it pivots about the fastener whereby the block serves as a wedge.

4. In a rotatable unit, an elongated, transversely circular shaft having a pair of diametrically opposed, transverse grooves and a longitudinal axis about which the same rotates, said shaft being provided with a pair of opposed, flat, parallel walls forming the sides of each groove respectively, said side walls having arcuate outermost edges coincident with the periphery of the shaft; a power transmitting member having a circular bore surrounding the shaft adjacent the grooves; a block extending into each groove respectively and spanning the distance between said side walls thereof, said blocks being disposed in flat, overlapping engagement with one face of the member exteriorly of the grooves; and an elongated pivot fastener for the blocks extending through the member and each block respectively exteriorly of the grooves in parallelism with said axis and clamping the blocks and member together, said blocks each having an elongated, flat, innermost edge always flatly engaging the shaft in the bottoms of the grooves and disposed transversely of the shaft whereby the blocks hold the member against rotation relative to the shaft and against longitudinal reciprocation along the shaft, said blocks sliding along said bottoms of the grooves in opposite directions as the blocks pivot about the fasteners whereby the blocks serve as wedges.

5. In a rotatable unit, an elongated, transversely circular shaft having a pair of diametrically opposed, transverse grooves and a longitudinal axis about which the same rotates, said shaft being provided with a flat, rectangular wall forming the bottom of each groove respectively and a pair of opposed, flat, parallel walls forming the sides of each groove respectively, said bottom walls being in parallelism, said side walls having straight edges at the lines of merger thereof with said bottom walls and arcuate, outermost edges coincident with the periphery of the shaft; a pair of spaced power transmitting members each having a circular bore surrounding the shaft adjacent the grooves; a block extending into each groove respectively and spanning the distance between said side walls thereof, said blocks being disposed between the members in flat, overlapping engagement with proximal faces thereof exteriorly of the grooves; and an elongated pivot fastener for each block respectively, said fasteners extending through the members and through corresponding blocks exteriorly of the grooves in parallelism with said axis and clamping the blocks and members together, said blocks each having an elongated, flat, innermost edge always flatly engaging said bottom walls, whereby the blocks hold the members against rotation relative to the shaft and against longitudinal reciprocation along the shaft, said blocks sliding along said bottom walls in opposite directions as they pivot about the fasteners whereby the blocks serve as wedges.

References Cited in the file of this patent

UNITED STATES PATENTS

| 434,478 | Simonds | Aug. 19, 1890 |
| 512,529 | Aichele | Jan. 9, 1894 |
| 1,562,937 | Beardsley et al. | Nov. 24, 1925 |
| 1,750,827 | Wemp | Mar. 18, 1930 |
| 1,768,595 | Gilson | July 1, 1930 |
| 2,026,454 | Benzing | Dec. 31, 1935 |

FOREIGN PATENTS

| 341,283 | Germany | Sept. 28, 1921 |
| 746,935 | France | June 8, 1933 |